(12) United States Patent
Murotani et al.

(10) Patent No.: US 10,793,717 B2
(45) Date of Patent: *Oct. 6, 2020

(54) THERMOSETTING RESIN COMPOSITION, CURED FILM, SUBSTRATE WITH CURED FILM, AND ELECTRONIC COMPONENT

(71) Applicant: JNC CORPORATION, Tokyo (JP)

(72) Inventors: Atsushi Murotani, Ichihara (JP);
Takayuki Hirota, Ichihara (JP);
Katsuyuki Sugihara, Ichihara (JP);
Yoshihiro Deyama, Ichihara (JP);
Shinta Morokoshi, Ichihara (JP);
Setsuo Itami, Ichihara (JP); Toshiyuki Takahashi, Ichihara (JP)

(73) Assignee: JNC CORPORATION, Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 15/544,472

(22) PCT Filed: Jan. 20, 2016

(86) PCT No.: PCT/JP2016/051487
§ 371 (c)(1),
(2) Date: Jul. 18, 2017

(87) PCT Pub. No.: WO2016/117579
PCT Pub. Date: Jul. 28, 2016

(65) Prior Publication Data
US 2018/0009983 A1  Jan. 11, 2018

(30) Foreign Application Priority Data

Jan. 23, 2015 (JP) ................. 2015-011823

(51) Int. Cl.
| | | |
|---|---|---|
| C08L 77/12 | (2006.01) | |
| C08L 63/00 | (2006.01) | |
| C08G 73/10 | (2006.01) | |
| C08G 73/16 | (2006.01) | |
| C09D 179/08 | (2006.01) | |
| C09D 7/61 | (2018.01) | |
| C08G 59/24 | (2006.01) | |
| C08G 59/42 | (2006.01) | |
| C09D 163/00 | (2006.01) | |
| C09D 177/12 | (2006.01) | |
| C08K 3/22 | (2006.01) | |
| C08K 5/1539 | (2006.01) | |
| C08K 3/013 | (2018.01) | |

(52) U.S. Cl.
CPC ........... *C08L 77/12* (2013.01); *C08G 59/245* (2013.01); *C08G 59/4223* (2013.01); *C08G 73/1053* (2013.01); *C08G 73/1064* (2013.01); *C08G 73/1071* (2013.01); *C08G 73/16* (2013.01); *C08L 63/00* (2013.01); *C09D 7/61* (2018.01); *C09D 163/00* (2013.01); *C09D 177/12* (2013.01); *C09D 179/08* (2013.01); *C08K 2003/2237* (2013.01)

(58) Field of Classification Search
CPC .......... C08L 77/12; C08L 63/00; C09D 7/61; C09D 163/00; C09D 177/12; C09D 179/08; C08G 59/245; C08G 59/4223; C08G 73/1053; C08G 73/1064; C08G 73/1071; C08G 73/16; C08K 2003/2237
USPC ....................................... 523/458
See application file for complete search history.

(56) References Cited

U.S. PATENT DOCUMENTS

2009/0026425 A1* 1/2009 Satou ................ C08L 79/08
252/586

FOREIGN PATENT DOCUMENTS

| | | | | |
|---|---|---|---|---|
| CN | 104058993 A | 9/2014 | | |
| CN | 104098756 A | 10/2014 | | |
| JP | 04323216 A | * 11/1992 | ............ | C08G 59/24 |
| JP | 05148411 A | * 6/1993 | ............ | C08L 63/00 |
| JP | 2005-105264 A | 4/2005 | | |
| JP | 2008-156546 A | 7/2008 | | |
| JP | 2009-122478 A | 6/2009 | | |
| JP | 2009-210688 A | 9/2009 | | |
| JP | 2009-237225 A | 10/2009 | | |
| JP | 2009-237441 A | 10/2009 | | |
| JP | 2009235147 A | * 10/2009 | ............... | C08J 5/00 |
| JP | 4569233 B | 8/2010 | | |
| JP | 2012-102228 A | 5/2012 | | |
| TW | 200909521 A | 3/2009 | | |
| TW | I341850 B | 5/2011 | | |

OTHER PUBLICATIONS

Fukumura et al., JP 2005-105264 A machine translation in English, Apr. 21, 2005 (Year: 2005).*
Nagashima et al., JP 2009-235147 A machine translation in English, Oct. 15, 2009 (Year: 2009).*
Shiobara et al., JP 05-148411 A machine translation in English, Jun. 15, 1993 (Year: 1993).*

(Continued)

*Primary Examiner* — David T Karst
(74) *Attorney, Agent, or Firm* — Hamre, Schumann, Mueller & Larson, P.C.

(57) ABSTRACT

Provided are a thermosetting resin composition containing polyester amide acid (A), epoxy compound (B) having a fluorene skeleton, epoxy curing agent (C) and colorant (D), and the thermosetting resin composition capable of forming a cured film having an excellent balance of satisfactory hardness and adhesion to glass under high-temperature conditions, and also an application of the thermosetting resin composition.

19 Claims, No Drawings

(56) References Cited

OTHER PUBLICATIONS

Ishihara et al., JP 04-323216 A, machine translation in English, Nov. 12, 1992 (Year: 1992).*
International Search Report and Written Opinion, International Patent Application No. PCT/JP2016/051487, with English translation of Search Report (8 pages), dated Mar. 15, 2016.
Office Action, Chinese Patent Application No. 201680006583.6, dated Feb. 1, 2019, with machine translation (29 pages).
Office Action, Chinese Patent Application No. 201680006583.6, dated Nov. 4, 2019, with machine translation (16 pages).
Machine translation of Office Action issued in Japanese Patent Application No. 2016-570666, dated Jul. 23, 2019 (4 pages).
3rd Office Action, Chinese Patent Application No. 201680006583.6, dated Jun. 23, 2020 with English machine translation of the Examiner's opinion part (6 pages).

* cited by examiner

THERMOSETTING RESIN COMPOSITION, CURED FILM, SUBSTRATE WITH CURED FILM, AND ELECTRONIC COMPONENT

TECHNICAL FIELD

The invention relates to a thermosetting resin composition, a cured film, a substrate with a cured film and an electronic component. More specifically, the invention relates to a thermosetting resin composition containing a specific compound and a specific colorant, a cured film formed from the composition, a substrate with a cured film having the cured film, and an electronic component having the cured film or the substrate with the cured film.

BACKGROUND ART

In a liquid crystal display device, a light shielding member called a black matrix is required for a portion between pixels or the like, in which entry of light should be prevented. Moreover, in a smartphone, the light shielding member is required for the purpose of shielding an electrode part around a screen portion in appearance.

In the light shielding members, a metal-based material such as chromium that has been used so far for all, and also a composition prepared by mixing a polymer material such as a resin and a colorant such as titanium compound particles is used.

On such materials that can be used in the shielding member, various compositions have been studied.

Patent literature No. 1 and Patent literature No. 2 disclose a resin composition containing polyester amide acid having specific structure, an epoxy resin, an epoxy curing agent and so forth, for example. However, in all of the Patent literature, nothing has been studied on adhesion to glass after treatment at high temperature is applied to a cured film obtained from the composition.

Patent literature No. 3 discloses a curable composition containing an epoxy compound having a fluorene skeleton, and a curing agent. However, in Patent literature No. 3, nothing has been studied on adhesion to glass after treatment at high temperature is applied to a cured film obtained from the composition.

CITATION LIST

Patent Literature

Patent literature No. 1: JP 2005-105264 A
Patent literature No. 2: JP 2008-156546 A
Patent literature No. 3: JP 2012-102228 A

SUMMARY OF INVENTION

Technical Problem

The invention is contemplated for providing a thermosetting resin composition capable of forming a well-balanced and excellent cured film in hardness and adhesion to glass, and an application thereof.

Solution to Problem

The present inventors have diligently continued to study in order to solve the problems described above.

When the present inventors have studied the resin composition specifically described in the Patent literature, for example, a cured film obtained from the composition has been poor in adhesion to glass or ITO.

The present inventors have studied in various manners in light of findings described above, and as a result, the present inventors have found that the problems can be solved by a thermosetting resin composition having structure described below, and have completed the invention.

More specifically, the invention relates to items described below, for example.

Item 1. A thermosetting resin composition, containing polyester amide acid (A), epoxy compound (B) having a fluorene skeleton, epoxy curing agent (C) and colorant (D).

Item 2. The thermosetting resin composition according to item 1, wherein an epoxy equivalent in epoxy compound (B) having the fluorene skeleton is 200 to 550 g/eq.

Item 3. The thermosetting resin composition according to item 1 or 2, containing epoxy curing agent (C) in an amount of 1 to 380 parts by weight based on 100 parts by weight in a total of epoxy compound (B) having the fluorene skeleton.

Item 4. The thermosetting resin composition according to any one of items 1 to 3, containing epoxy compound (B) having the fluorene skeleton in an amount of 10 to 400 parts by weight based on 100 parts by weight of polyester amide acid (A).

Item 5. The thermosetting resin composition according to any one of items 1 to 4, wherein epoxy curing agent (C) is an anhydride curing agent.

Item 6. The thermosetting resin composition according to any one of items 1 to 5, wherein a weight average molecular weight of polyester amide acid (A) is 2,000 to 30,000.

Item 7. The thermosetting resin composition according to any one of item is to 6, wherein polyester amide acid (A) is a compound having a structural unit represented by formulas (1) and (2).

Formula 1

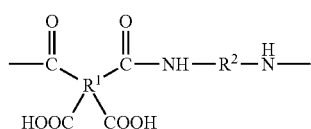

(1)

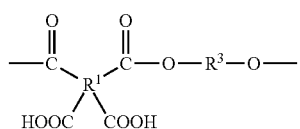

(2)

(wherein, in the formula, $R^1$ is independently a tetravalent organic group having 1 to 30 carbons, $R^2$ is a divalent organic group having 1 to 40 carbons, and $R^3$ is a divalent organic group having 1 to 20 carbons.)

Item 8. The thermosetting resin composition according to any one of items 1 to 7, wherein polyester amide acid (A) is a compound obtained by allowing tetracarboxylic dianhydride (a1), diamine (a2) and polyvalent hydroxy compound (a3) to react thereamong as essential components.

Item 9. The thermosetting resin composition according to any one of items 1 to 8, wherein polyester amide acid (A) is a compound obtained by allowing tetracarboxylic dianhydride (a1), diamine (a2), polyvalent hydroxy compound (a3) and monohydric alcohol (a4) to react thereamong as essential components.

Item 10. The thermosetting resin composition according to any one of items 1 to 9, wherein polyester amide acid (A)

is a compound obtained by allowing X mol of tetracarboxylic dianhydride (a1), Y mol of diamine (a2) and Z mol of polyvalent hydroxy compound (a3) to react thereamong in a ratio at which relationships in expressions (3) and (4) hold:

$$0.2 \leq Z/Y \leq 8.0 \tag{3}$$

$$0.2 \leq (Y+Z)/X \leq 1.5 \tag{4}$$

Item 11. The thermosetting resin composition according to any one of items 8 to 10, wherein tetracarboxylic dianhydride (a1) is at least one kind of compound selected from the group of 3,3',4,4'-diphenylsulfonetetracarboxylic dianhydride, 3,3'4,4'-diphenylethertetracarboxylic dianhydride, 2,2-(bis(3,4-dicarboxyphenyl)) hexafluoropropane dianhydride and ethylene glycol bis(anhydrotrimellitate).

Item 12. The thermosetting resin composition according to any one of items 8 to 11, wherein diamine (a2) is at least one kind of compound selected from the group of 3,3'-diaminodiphenyl sulfone and bis[4-(3-aminophenoxy)phenyl] sulfone.

Item 13. The thermosetting resin composition according to any one of items 8 to 12, wherein polyvalent hydroxy compound (a3) is at least one kind of compound selected from the group of ethylene glycol, propylene glycol, 1,4-butanediol, 1,5-pentanediol, 1,6-hexanediol, 1,7-heptanediol and 1,8-octanediol.

Item 14. The thermosetting resin composition according to any one of items 9 to 13, wherein monohydric alcohol (a4) is at least one kind of compound selected from the group of isopropyl alcohol, allyl alcohol, benzyl alcohol, hydroxyethyl methacrylate, propylene glycol monoethyl ether and 3-ethyl-3-hydroxymethyl oxetane.

Item 15. The thermosetting resin composition according to any one of items 8 to 14, wherein tetracarboxylic dianhydride (a1) is 3,3',4,4'-diphenylethertetracarboxylic dianhydride, diamine (a2) is 3,3'-diaminodiphenyl sulfone, polyvalent hydroxy compound (a3) is 1,4-butanediol, and epoxy curing agent (C) is trimellitic anhydride.

Item 16. The thermosetting resin composition according to any one of items 1 to 15, further containing solvent (E).

Item 17. The thermosetting resin composition according to any one of claims 1 to 16, wherein colorant (D) is titanium compound particles.

Item 18. A cured film, obtained from the thermosetting resin composition according to any one of items 1 to 17.

Item 19. A substrate with a cured film, having the cured film according to item 18.

Item 20. An electronic component, having the cured film according to item 18 or the substrate with the cured film according to item 19.

Advantageous Effects of Invention

According to the invention, a cured film having hardness at a certain degree, satisfactory adhesion to glass, and having the effects in a well-balanced manner can be formed. Thus, the thermosetting resin composition of the invention is significantly highly practical. A light shielding member or the like can be prepared with good productivity by an inkjet method, for example.

DESCRIPTION OF EMBODIMENTS

In the following, a thermosetting resin composition (hereinafter, also referred to as "composition of the invention"), a method of preparing the composition, a method of forming a cured film, a substrate with a cured film, and an electronic component according to the invention will be described in detail.

1. Thermosetting Resin Composition

A composition of the invention contains polyester amide acid (A), epoxy compound (B) having a fluorene skeleton, epoxy curing agent (C) and colorant (D). The composition of the invention may contain an additive in addition to the components.

According to such a composition of the invention, a well-balanced and excellent cured film in hardness, adhesion to glass or ITO, and resistance to an ITO etchant containing oxalic acid can be obtained. In the composition of the invention, the cured films different in color or light shielding properties can be obtained by adjusting a kind of a colorant and an amount of addition thereof. Thus, according to the composition of the invention, a light shielding member or the like in which high light shielding properties are required can be prepared with good productivity. Accordingly, the composition of the invention can be preferably used in such an application.

Only when the composition of the invention contains polyester amide acid (A), epoxy compound (B) having the fluorene skeleton, and epoxy curing agent (C), the cured film excellent in the effect, particularly, excellent in adhesion to glass or ITO, or the like can be obtained.

In the conventional composition formed of polyester amide acid or the conventional composition formed of the epoxy compound having the fluorene skeleton and the epoxy curing agent, such a cured film excellent in adhesion to the substrate has been unable to be obtained.

Accordingly, the composition of the invention is a composition having an effect that is unable to be expected from the conventional compositions, and a composition having a synergetic effect of the conventional composition formed of polyester amide acid, and the conventional composition formed of the epoxy compound having the fluorene skeleton and the epoxy curing agent.

The composition of the invention can be used as a thermosetting inkjet ink composition to be jetted by an inkjet method. In the present description, jetting of an ink by the inkjet method is also referred to as jetting and the characteristics thereof are also referred to as jetting properties or jetting characteristics.

1.1. Polyester Amide Acid (A)

Polyester amide acid (A) used in the invention is not particularly limited, but is preferably a compound having an ester bond, an amide bond and a carboxyl group, and specifically, is further preferably a compound having a structural unit represented by formulas (1) and (2).

Only when such polyester amide acid (A) is used in combination with a specific epoxy compound and specific epoxy curing agent, the composition that can form the well-balanced and excellent cured film in hardness and resistance to the ITO etchant containing oxalic acid, and further the excellent cured film in adhesion to glass or ITO can be obtained.

With regard to polyester amide acid (A), one kind thereof or two or more kinds thereof may be used.

Formula 2

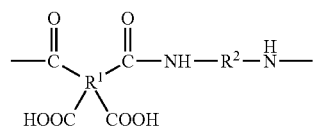

(1)

-continued

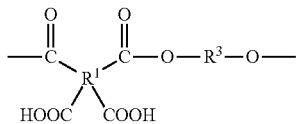
(2)

(wherein, $R^1$ is independently a tetravalent organic group having 1 to 30 carbons, $R^2$ is a divalent organic group having 1 to 40 carbons, and $R^3$ is a divalent organic group having 1 to 20 carbons.).

Since a compound having good compatibility with other components in the composition can be obtained, $R^1$ is independently preferably a tetravalent organic group having 2 to 25 carbons, further preferably a tetravalent organic group having 2 to 20 carbons, and still further preferably a group represented by formula (5).

Formula 3

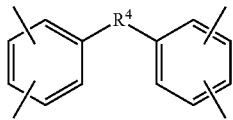
(5)

(In formula (5), $R^4$ is —O—, —CO—, —SO$_2$—, —C(CF$_3$)$_2$—, —$R^5$— or —COO—$R^5$—OCO—. ($R^5$ is independently an alkyl group having 1 to 4 carbons.)).

In view of capability of obtaining the compound having good compatibility with other components in the composition, and capability of obtaining the cured film having excellent adhesion to glass or ITO, or the like, $R^2$ is preferably a divalent organic group having 2 to 35 carbons, further preferably a divalent organic group having 2 to 30 carbons, and still further preferably a group represented by formula (6).

Formula 4

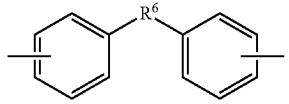
(6)

(In formula (6), $R^6$ is —O—, —CO—, —SO$_2$—, —C(CF$_3$)$_2$—, —$R^7$—, or —O-ph-$R^8$-ph-O—. (ph is a benzene ring and $R^8$ is —O—, —CO—, —SO$_2$—, —C(CF$_3$)$_2$—, or —$R^7$—.) In addition, $R^7$ is independently an alkyl group having 1 to 4 carbons.)

$R^3$ is preferably a divalent organic group having 2 to 15 carbons, further preferably a group represented by formula (7), —$R^{10}$—N$R^{11}$—$R^{12}$— ($R^{10}$ and $R^{12}$ are independently alkylene having 1 to 8 carbons, and $R^{11}$ is alkyl having 1 to 8 carbons in which hydrogen or at least one hydrogen may be replaced by hydroxyl.), alkylene having 2 to 15 carbons, or a group in which at least one hydrogen in alkylene having 2 to 15 carbons may be replaced by hydroxyl and may have —O—, and still further preferably divalent alkylene having 2 to 6 carbons.

Formula 5

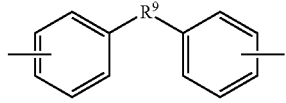
(7)

(In formula (7), $R^9$ is —O—, —CO—, —SO$_2$—, —C(CF$_3$)$_2$—, —$R^7$—, or -ph-$R^8$-ph-. (ph is a benzene ring, and $R^8$ is —O—, —CO—, —SO$_2$—, —C(CF$_3$)$_2$—, or —$R^7$—.). In addition, $R^7$ is independently an alkyl group having 1 to 4 carbons.).

Polyester amide acid (A) is preferably a compound obtained by allowing a component containing tetracarboxylic dianhydride (a1), a component containing diamine (a2), and a component containing polyvalent hydroxy compound (a3) to react thereamong, and also is preferably a compound obtained by allowing a component containing tetracarboxylic dianhydride (a1), a component containing diamine (a2), a component containing polyvalent hydroxy compound (a3), and a component containing monohydric alcohol (a4) to react thereamong.

More specifically, in formulas (1) and (2), $R^1$ is, independently preferably, a tetracarboxylic dianhydride residue, $R^2$ is a diamine residue, and $R^3$ is a polyvalent hydroxy compound residue.

In addition, upon the reaction, reaction solvent (a5), acid anhydride (a6), or the like may be used.

In the component containing tetracarboxylic dianhydride (a1), tetracarboxylic dianhydride (a1) only needs be contained, and other compound than the compound only needs be contained. A rule described above also applies to other components described above in a similar manner.

With regard to each of (a1) to (a6) described above, only one kind thereof or two or more kinds thereof may be used.

When polyester amide acid (A) has an acid anhydride group at a molecular terminal, when necessary, polyester amide acid (A) is preferably a compound obtained by allowing monohydric alcohol (a4) to react therewith. Polyester amide acid (A) obtained by using monohydric alcohol (a4) tends to be a compound excellent in compatibility with epoxy compound (B) having the fluorene skeleton and epoxy curing agent (C), and a composition excellent in applicability tends to be obtained.

1.1.1 Tetracarboxylic Dianhydride (a1)

Tetracarboxylic dianhydride (a1) is not particularly limited. Specific examples include aromatic tetracarboxylic dianhydride such as 3,3',4,4'-benzophenonetetracarboxylic dianhydride, 2,2',3,3'-benzophenonetetracarboxylic dianhydride, 2,3,3'4'-benzophenonetetracarboxylic dianhydride, 3,3',4,4'-diphenylsulfonetetracarboxylic dianhydride, 2,2',3, 3'-diphenylsulfonetetracarboxylic dianhydride, 2,3,3',4'-diphenylsulfonetetracarboxylic dianhydride, 3,3',4,4'-diphenylether tetracarboxylic dianhydride, 2,2',3,3'-diphenylether tetracarboxylic dianhydride, 2,3,3',4'-diphenylether tetracarboxylic dianhydride, 2,2-[bis(3,4-dicarboxyphenyl)] hexafluoropropane dianhydride and ethylene glycol bis(anhydrotrimellitate) (product name: TMEG-100, made by New Japan Chemical Co., Ltd.), alicyclic tetracarboxylic dianhydride such as cyclobutanetetracarboxylic dianhydride, methylcyclobutanetetracarboxylic dianhydride, cyclopentanetetracarboxylic dianhydride and cyclohexanetetracarboxylic dianhydride, and aliphatic tetracarboxylic dianhydride such as ethanetetracarboxylic dianhydride and butanetetracarboxylic dianhydride.

Among the materials, in view of capability of obtaining the compound having good adhesion to the glass substrate by simultaneously using the epoxy compound having the fluorene skeleton, or the like, 3,3',4,4'-diphenylsulfonetetracarboxylic dianhydride, 3,3',4,4'-diphenylethertetracarboxylic dianhydride, 2,2-[bis(3,4-dicarboxyphenyl)] hexafluoropropane dianhydride and ethylene glycol bis (anhydrotrimellitate) (product name; TMEG-100, made by New Japan Chemical Co., Ltd.) are preferred, and 3,3',4,4'-diphenylether tetracarboxylic dianhydride and 3,3',4,4'-diphenylsulfonetetracarboxylic dianhydride are particularly preferred.

1.1.2 Diamine (a2)

Diamine (a2) is not particularly limited. Specific examples include 4,4'-diaminodiphenyl sulfone, 3,3'-diaminodiphenyl sulfone, 3,4'-diaminodiphenyl sulfone, bis [4-(4-aminophenoxy)phenyl] sulfone, bis[4-(3-aminophenoxy)phenyl] sulfone, bis[3-(4-aminophenoxy)phenyl] sulfone, [4-(4-aminophenoxy)phenyl] [3-(4-aminophenoxy) phenyl] sulfone, [4-(3-aminophenoxy)phenyl] [3-(4-aminophenoxy)phenyl] sulfone and 2,2-bis[4-(4-aminophenoxy) phenyl] hexafluoropropane.

Among the materials, in view of capability of obtaining the compound having good adhesion to the glass substrate by simultaneously using the epoxy compound having the fluorene skeleton, or the like, 3,3'-diaminodiphenyl sulfone and bis[4-(3-aminophenoxy)phenyl] sulfone are preferred, and 3,3'-diaminodiphenyl sulfone is particularly preferred.

1.1.3 Polyvalent Hydroxy Compound (a3)

Polyvalent hydroxy compound (a3) is not particularly limited if a compound having two or more hydroxy groups is applied. Specific examples include ethylene glycol, diethylene glycol, triethylene glycol, tetraethylene glycol, polyethylene glycol having a molecular weight of 1,000 or less, propylene glycol, dipropylene glycol, tripropylene glycol, tetrapropylene glycol, polypropylene glycol having a molecular weight of 1,000 or less, 1,2-butanediol, 1,3-butanediol, 1,4-butanediol, 1,2-pentanediol, 1,5-pentanediol, 2,4-pentanediol, 1,2,5-pentanetriol, 1,2-hexanediol, 1,6-hexanediol, 2,5-hexanediol, 1,2,6-hexanetriol, 1,2-heptanediol, 1,7-heptanediol, 1,2,7-heptanetriol, 1,2-octanediol, 1,8-octanediol, 3,6-octanediol, 1,2,8-octanetriol, 1,2-nonanediol, 1,9-nonanediol, 1,2,9-nonanetriol, 1,2-decanediol, 1,10-decanediol, 1,2,10-decanetriol, 1,2-dodecanediol, 1,12-dodecanediol, glycerin, trimethylolpropane, pentaerythritol, dipentaerythritol, bisphenol A, bisphenol S, bisphenol F, diethanolamine and triethanolamine.

Among the materials, ethylene glycol, propylene glycol, 1,4-butanediol, 1,5-pentanediol, 1,6-hexanediol, 1,7-heptanediol and 1,8-octanediol are preferred, and 1,4-butanediol, 1,5-pentanediol and 1,6-hexanediol are particularly preferred in view of good solubility in reaction solvent (a5), or the like.

1.1.4 Monohydric Alcohol (a4)

Monohydric alcohol (a4) is not particularly limited if a compound having one hydroxy group is applied. Specific examples include methanol, ethanol, 1-propanol, isopropyl alcohol, allyl alcohol, benzyl alcohol, hydroxyethyl methacrylate, propylene glycol monoethyl ether, propylene glycol monomethyl ether, dipropylene glycol monoethyl ether, dipropylene glycol monomethyl ether, ethylene glycol monoethyl ether, ethylene glycol monomethyl ether, diethylene glycol monoethyl ether, diethylene glycol monomethyl ether, phenol, borneol, maltol, linalool, terpineol, dimethyl benzyl carbinol and 3-ethyl-3-hydroxymethyl oxetane.

Among the material, isopropyl alcohol, allyl alcohol, benzyl alcohol, hydroxyethyl methacrylate, propylene glycol monoethyl ether, and 3-ethyl-3-hydroxymethyl oxetane are preferred. In consideration of compatibility of resulting polyester amide acid (A) with epoxy compound (B) having the fluorene skeleton, and epoxy curing agent (C), and applicability of the resulting composition to the glass and the ITO, benzyl alcohol is further preferred as monohydric alcohol (a4).

1.1.5 Reaction Solvent (a5)

Reaction solvent (a5) is not particularly limited. Specific examples include diethylene glycol dimethyl ether, diethylene glycol diethyl ether, diethylene glycol methyl ethyl ether, diethylene glycol monoethyl ether acetate, triethylene glycol dimethyl ether, ethylene glycol monoethyl ether acetate, propylene glycol monomethylether acetate, methyl 3-methoxypropionate, ethyl 3-ethoxypropionate, ethyl lactate, cyclohexanone, N-methyl-2-pyrrolidone and N,N-dimethylacetamide.

Among the materials, propylene glycol monomethyl ether acetate, diethylene glycol methyl ethyl ether, triethylene glycol dimethyl ether, methyl 3-methoxypropionate, and N-methyl-2-pyrrolidone are preferred in view of solubility.

In addition, although specific examples of reaction solvents (a5) includes the solvents described above, a mixed solvent in which a solvent other than the solvent described above is mixed can be used as the solvent if a proportion of 30% by weight or less is applied based on the total amount of the solvent used in the reaction described above.

1.1.6 Acid Anhydride (a6)

Acid anhydride is not particularly limited. Specific examples include carboxylic anhydride such as 3-(triethoxysilyl)propyl succinic anhydride and maleic acid anhydride. Moreover, polyanhydride such as a copolymer containing carboxylic anhydride can also be used. Examples of commercial items of the polyanhydride include SMA (product name, made by Kawahara Petrochemical Co., Ltd.) being a styrene/maleic acid anhydride copolymer.

Synthesis of Polyester Amide Acid (A) Synthesis

A method of synthesis of polyester amide acid (A) is not particularly limited. However, a method of allowing tetracarboxylic dianhydride (a1), diamine (a2), and polyvalent hydroxy compound (a3), and when necessary, monohydric alcohol (a4) to react thereamong as essential components is preferred, and the reaction is further preferably performed in reaction solvent (a5).

The order of addition of each component upon the reaction is not particularly fixated. More specifically, tetracarboxylic dianhydride (a1), diamine (a2), polyvalent hydroxy compound (a3) and acid anhydride (a6) may be simultaneously added to reaction solvent (a5), and then allowed to react thereamong, or diamine (a2) and polyvalent hydroxy compound (a3) are dissolved in reaction solvent (a5), and then tetracarboxylic dianhydride (a1) and acid anhydride (a6) may be added thereto, and then allowed to react thereamong. Alternatively, tetracarboxylic dianhydride (a1), acid anhydride (a6) and diamine (a2) are allowed to react in advance, and then polyvalent hydroxy compound (a3) is added to the reaction product, and allowed to react thereamong. Any of the methods can be applied.

In addition, monohydric alcohol (a4) may be added at any time point in the reaction.

Moreover, in order to increase a weight average molecular weight of polyester amide acid (A) obtained upon the reaction, a compound having three or more acid anhydride groups is added thereto, and a synthesis reaction may be performed. Specific examples of the compounds having three or more acid anhydride groups include a styrene/maleic anhydride copolymer.

The thus synthesized polyester amide acid contains the structural unit represented by formulas (1) and (2) each, in which a terminal thereof is an acid anhydride group, an 0amino group or a hydroxy group each being derived from tetracarboxylic dianhydride, diamine or a polyvalent hydroxy compound each being a raw material, or a group (for example, a monovalent alcohol residue) derived from a component other than the compounds.

When amounts of use of tetracarboxylic dianhydride (a1), diamine (a2) and polyvalent hydroxy compound (a3) are taken as X moles, Y moles and Z moles, respectively, relationships represented by expression (3) and expression (4) preferably hold among X, Y and Z. Polyester amide acid (A) having high solubility in solvent (E) described below can be obtained, a composition having excellent applicability, and a cured film having excellent flatness can be obtained by using each component in such an amount.

$$0.2 \le Z/Y \le 8.0 \quad (3)$$

$$0.2 \le (Y+Z)/X \le 1.5 \quad (4)$$

The relationship of expression (3) is represented further preferably by an expression: $0.7 \le Z/Y \le 7.0$, and still further preferably by an expression: $1.3 \le Z/Y \le 7.0$. The relationship of expression (4) is represented further preferably by an expression: $0.3 \le (Y+Z)/X \le 1.2$, and still further preferably by an expression: $0.4 \le (Y+Z)/X \le 1.0$.

When an amount of use of monohydric alcohol (a4) in the reaction is taken as Z' mole, the amount of use thereof is not particularly limited, but is represented preferably by an expression: $0.1 \le Z'/X \le 5.0$, and further preferably by an expression: $0.2 \le Z'/X \le 4.0$.

If reaction solvent (a5) is used in an amount of 100 parts by weight or more based on 100 parts by weight in a total of tetracarboxylic dianhydride (a1), diamine (a2) and polyvalent hydroxy compound (a3), the reaction smoothly progresses, and therefore such a case is preferred.

The reaction is preferably performed at 40 to 200° C. for 0.2 to 20 hours.

Physical Properties, Amount of Use, or the Like of Polyester Amide Acid (A)

A weight average molecular weight measured by Gel Permeation Chromatography (GPC) of polyester amide acid (A) is preferably 2,000 to 30,000, and further preferably 3,000 to 30,000, in view of solubility in solvent (E), and capability of obtaining a cured film being balanced in adhesion to glass or ITO, and chemical resistance by simultaneously using thereof with epoxy compound (B) having the fluorene skeleton, or the like.

The weight average molecular weight can be measured specifically by the method described in Examples described below.

Viscosity of polyester amide acid (A) is preferably 5 to 200 mPa s, further preferably 10 to 150 mPa s, and still further preferably 15 to 100 mPa s, at 25° C., in view of handling properties of resulting polyester amide acid (A) and adjusting the weight average molecular weight to the preferred range described above.

A content of polyester amide acid (A) is preferably 1 to 60 parts by weight, further preferably 5 to 55% by weight, and still further preferably 5 to 50% by weight, based on 100% by weight of a solid content (residue obtained by removing the solvent from the composition) in the composition of the invention, in view of capability of obtaining the cured film having excellent chemical resistance.

1.2. Epoxy Compound (B) Having a Fluorene Skeleton

Epoxy compound (B) having the fluorene skeleton used in the invention is not particularly limited if an epoxy compound having the fluorene skeleton is applied. Such epoxy compound (B) having the fluorene skeleton has high decomposition temperature and excellent heat-resistance stability, and therefore the cured film also having the effect can be obtained.

Epoxy compound (B) having the fluorene skeleton is ordinarily an epoxy compound containing two or more oxirane rings or oxetane rings in a molecule.

With regard to epoxy compound (B) having the fluorene skeleton, only one kind thereof may be used or two or more kinds thereof may be used.

An epoxy equivalent in epoxy compound (B) having the fluorene skeleton is preferably 200 to 550 g/eq, further preferably 220 to 490 g/eq, and still further preferably 240 to 480 g/eq, in view of capability of obtaining the cured film having excellent chemical resistance.

The epoxy equivalent of epoxy compound (B) having the fluorene skeleton can be measured by a method described in JIS K 7236, for example.

Epoxy compound (B) having the fluorene skeleton may be obtained by synthesizing the compound and may be a commercial item.

Specific examples of the commercial items of epoxy compound (B) having the fluorene skeleton include OGSOL PG-100 (product name, made by Osaka Gas Chemicals Co., Ltd., epoxy equivalent: 259 g/eq), OGSOL CG-500 (product name, made by Osaka Gas Chemicals Co., Ltd., epoxy equivalent: 311 g/eq), OGSOL EG-200 (product name, made by Osaka Gas Chemicals Co., Ltd., epoxy equivalent: 292 g/eq), OGSOL EG-250 (product name, made by Osaka Gas Chemicals Co., Ltd., epoxy equivalent: 417 g/eq), OGSOL EG-280 (product name, made by Osaka Gas Chemicals Co., Ltd., epoxy equivalent: 467 g/eq) and OGSOL CG-400 (epoxy equivalent: 540 g/eq).

In view of capability of obtaining the well-balanced and excellent cured film in heat resistance, chemical resistance and adhesion to glass or ITO, or the like, a content of epoxy compound (B) having the fluorene skeleton is preferably 1 to 90% by weight, further preferably 3 to 80% by weight, and still further preferably 5 to 70% by weight, based on 100% by weight of a solid content (residue obtained by removing the solvent from the composition) in the composition of the invention, and is preferably 10 to 400 parts by weight, further preferably 20 to 350 parts by weight, and still further preferably 30 to 300 parts by weight, based on 100 parts by weight of polyester amide acid (A).

1.3. Epoxy Curing Agent (C)

In the composition of the invention, epoxy curing agent (C) is blended. Thus, the cured film having excellent heat resistance and chemical resistance can be obtained.

Epoxy curing agent (C) is a compound different from polyester amide acid (A), and specific examples thereof include an anhydride curing agent, a polyamine curing agent, a polyphenol curing agent and a catalyst type curing agent. However, an anhydride curing agent is preferred in view of coloring resistance, heat resistance, or the like.

With regard to epoxy curing agent (C), one kind thereof may be used, or two or more kinds thereof may be used.

Specific examples of the anhydride curing agents include: aliphatic dicarboxylic anhydride such as maleic acid anhydride, tetrahydrophthalic anhydride, hexahydrophthalic acid anhydride and methylhexahydrophthalic acid anhydride; aromatic polyvalent carboxylic acid anhydride such as phthalic anhydride and trimellitic anhydride; and a styrene/maleic acid anhydride copolymer. Among the materials, trimellitic anhydride chloride is particularly preferred in view of capability of obtaining the compound having excellent solubility in solvent (E), the cured film having excellent heat resistance, or the like.

In view of capability of obtaining the well-balanced and excellent cured film in hardness, resistance to a chemical such as an oxalic acid solution, and adhesion to glass or ITO, or the like, a content of epoxy curing agent (C) is preferably 0.1 to 50% by weight, further preferably 0.2 to 50% by weight, and still further preferably 0.3 to 45% by weight, based on 100% by weight of a solid content (residue obtained by removing the solvent from the composition) in the composition of the invention, and is preferably 1 to 380 parts by weight, further preferably 3 to 350 parts by weight, and still further preferably 5 to 150 parts by weight, based on 100 parts by weight in a total of the epoxy compound in the composition of the invention.

In addition, a total of the epoxy compound in the composition of the invention means a total of epoxy compound (B) having the fluorene skeleton and the epoxy compound used as an additive.

Moreover, with regard to a ratio of epoxy curing agent (C) to epoxy compound (B) having the fluorene skeleton to be used, in view of capability of obtaining the cured film having excellent heat resistance and chemical resistance, or the like, an amount of a group that can react with an epoxy group, such as an anhydride group and a carboxyl group in the epoxy curing agent, is preferably 0.2 to 2 times the equivalent, based on the amount of the epoxy group in epoxy compound (B) having the fluorene skeleton to be used, and if the ratio is 0.5 to 1.5 times the equivalent, the chemical resistance of the resulting cured film is further improved, and therefore such a case is further preferred. In addition, on the above occasion, for example, when 1 equivalent of a compound having one epoxy group is used as epoxy compound (B) having the fluorene skeleton and 1 equivalent of a compound having one anhydride group is used as epoxy curing agent (C), the amount of epoxy curing agent (C) to the epoxy compound (B) having the fluorene skeleton is taken as 2 times the equivalent.

1.4. Colorant (D)

In the composition of the invention, colorant (D) is blended.

Specific examples of colorants (D) include an inorganic colorant and an organic colorant. Color ink requires high color purity, chemical resistance and heat resistance. Thus, an organic dye or an inorganic pigment having excellent color purity, chemical resistance and heat resistance is preferred. When the cured film is used as the light shielding member, an inorganic pigment having high light shielding properties is preferred.

Specific examples of the inorganic pigments include silicon carbide, alumina, magnesia, silica, zinc oxide, titanium oxide, titanium black, graphite and carbon black. With regard to the inorganic pigment, one kind thereof may be used or two or more kinds thereof may be mixed and used.

Specific examples of the organic pigment include a pigment with a color index constitution number, such as C.I. pigment red 177, C.I. piyment red 178, C.I. pigment red 202, C.I. pigment 209, C.I. pigment red 254, C.I. pigment red 255, C.I. pigment green 7, C.I. pigment green 36, C.I. pigment blue 15, C.I. pigment blue 15:3, C.I. pigment blue 15:4, C.I. pigment blue 15:6, C.I. pigment blue 16, C.I. pigment yellow 83, C.I. pigment yellow 128, C.I. pigment yellow 138, C.I. pigment yellow 139, C.I. pigment yellow 150, C.I. pigment violet 23, C.I. pigment orange 43, C.I. pigment black 1 and C.I. pigment black 7, and spilon blue GNH (product name; Hodogaya Chemical Co., Ltd.).

With regard to the organic pigment, one kind thereof may be used or two or more kinds thereof may be mixed and used.

Specific examples of the dye include an azo dye, an azomethine dye, a xanthene dye and a quinone dye. Examples of the azo dye include "VALIFASTBLACK 3810," "VALIFASTBLACK 3820," "VALIFASTRED 3304," "VALIFASTRED 3320," "OIL BLACK 860" (product names for all, made by Orient Chemical Industries Co., Ltd.).

With regard to the dye, one kind thereof may be used and two or more kinds thereof may be mixed and used.

As colorant (D), a commercial item may be used.

When a titanium compound such as titanium black is blended as colorant (D) in the composition of the invention, a content of titanium compound particles is preferably 10 to 25% by weight based on 100% by weight of the composition. Viscosity of the composition can be adjusted to a level at which jetting properties are satisfactory by adjusting the content in the range described above.

A weight ratio of titanate oxide to titanate nitride in the titanium compound particles is preferably 0.5 to 0.9 parts by weight, further preferably 0.5 to 0.8 parts by weight, and still further preferably 0.5 to 0.7 parts by weight, based on 1 part by weight of titanate nitride. An effect of capability of further improving the light shielding properties of the thermosetting resin composition can be obtained by using the titanium compound particles in the weight ratio described above.

When the cured film obtained by curing the composition of the invention is used as the light shielding member, in view of capability of producing the cured film provided with light shielding properties suitable for use as the shielding member, an OD value per a film thickness of 1 μm of the cured film is preferably 2.0 or more, and further preferably 2.1 or more. Moreover, in view of achieving satisfactory adhesion of the cured film on glass, the OD value is preferably 3.0 or less, and further preferably 2.8 or less.

The optical density (OD) value is determined by using a Y value calculated from a value of light transmittance (T) by using UV-Vis Spectrophotometer V-670 (light source: D65) made by JASCO Corporation, according to the formula described below.

OD=−log(Y/100) in which a Y value is Y of tristimulus values of an object by transmission in the XYZ color system.

When the cured film obtained by curing the composition of the invention is used as the light shielding member, an inorganic pigment, particularly titanium black and carbon black are preferred. In view of capability of obtaining the cured film having high hardness, titanium black is further preferred.

The inorganic pigment is preferably 80 to 140 parts by weight, and further preferably 90 to 130 parts by weight, based on 100 parts by weight of a solid content in the composition. When titanium black is used as the inorganic pigment, the cured film provided with the light shielding properties suitable in an application as the light shielding member can be easily formed by adjusting the amount in the range described above. The cured film having satisfactory adhesion to the glass substrate can be produced by adjusting the amount of blending titanium black relative to 100 parts by weight of a resin solid content in the composition of the invention to 130 parts by weight or less.

1.5. Solvent (E)

The composition of the invention can be obtained by dissolving polyester amide acid (A), epoxy compound (B) having the fluorene skeleton and epoxy curing agent (C) in solvent (E), for example. Accordingly, solvent (E) is preferably a solvent in which polyester amide acid (A), epoxy compound (B) having the fluorene skeleton, and epoxy curing agent (C) can be dissolved. Even a solvent in which polyester amide acid (A), epoxy compound (B) having the fluorene skeleton, and epoxy curing agent (C) are unable to be dissolved when such a solvent is used alone can be used as solvent (E) by being mixed with other solvents in several cases.

With regard to solvent (E), only one kind thereof may be used or two or more kinds thereof may be used.

Specific examples of solvents (E) include ethyl lactate, ethanol, ethylene glycol, propylene glycol, glycerin, diethylene glycol dimethyl ether, diethylene glycol diethyl ether, diethylene glycol methyl ethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionate, cyclohexanone, 1,3-dioxolane, ethylene glycol diethyl ether, 1,4-dioxane, propylene glycol dimethyl ether, propylene glycol monomethyl ether, ethylene glycol monomethyl ether, ethylene glycol monomethyl ether acetate, anisole, dipropylene glycol dimethyl ether, diethylene glycol isopropyl methyl ether, dipropylene glycol monomethyl ether, diethylene glycol monomethyl ether, diethylene glycol butyl methyl ether, triethylene glycol dimethyl ether, diethylene glycol monobutyl ether, ethylene glycol monophenyl ether, triethylene glycol monomethyl ether, diethylene glycol dibutyl ether, propylene glycol monobutyl ether, propylene glycol monoethyl ether, triethylene glycol divinyl ether, tripropylene glycol monomethyl ether, tetramethylene glycol monovinyl ether, methyl benzoate, ethyl benzoate, 1-vinyl-2-pyrrolidone, 1-butyl-2-pyrrolidone, 1-ethyl-2-pyrrolidone, 1-(2-hydroxyethyl)-2-pyrrolidone, 2-pyrrolidone, N-methyl-2-pyrrolidone, 1-acetyl-2-pyrrolidone, N,N-dimethylacetamide, N,N-diethylacetamide, N,N-dimethylpropionamide, N-methyl-ε-caprolactam, 1,3-dimethyl-2-imidazolidinone, γ-butyrolactone, α-acetyl-γ-butyrolactone, ε-caprolactam, γ-hexanolactone, δ-hexanolactone, methyl ethyl sulfoxide, dimethyl sulfoxide and Ekuamido (product name) made by Idemitsu Kosan Co., Ltd.

Among the materials, in view of solubility in polyester amide acid (A), epoxy compound (B) having the fluorene skeleton, and epoxy curing agent (C), the composition of the invention preferably contains, as solvent (E), at least one kind selected from the group of ethylene glycol monobutyl ether, diethylene glycol monoethyl ether acetate, diethylene glycol dimethyl ether, diethylene glycol methyl ethyl ether, triethylene glycol dimethyl ether, propylene glycol monomethyl ether acetate, methyl 3-methoxypropionate, γ-butyrolactone, dimethyl sulfoxide and Ekuamido (product name) made by Idemitsu Kosan Co., Ltd.

In view of achieving satisfactory jetting properties of the composition, a content of the solvent is preferably 45 to 90% by weight, and further preferably 55 to 80% by weight, based on 100% by weight of the composition.

1.6. Additive

The composition of the invention may contain an additive other than polyester amide acid (A), epoxy compound (B) having the fluorene skeleton, epoxy curing agent (C) and colorant (D) in response to objective characteristics. Specific examples of the additive include an epoxy compound containing two or more oxirane rings or oxetane rings in a molecule, a polyimide resin, a polymerizable monomer, an antistatic agent, a coupling agent, a pH adjuster, a corrosion inhibitor, an antiseptic agent, an antifungal agent, an antioxidant, a surfactant, an epoxy curing accelerator, a reduction inhibitor, an evaporation accelerator, a chelating agent and a water-soluble polymer. With regard to the additive, one kind thereof may be used or two or more kinds thereof may be used.

1.6.1 Epoxy Compound

In the invention, the epoxy compound used as the additive means an epoxy compound other than the epoxy compound (B) having the fluorene skeleton.

As the epoxy compound, a compound having two or more oxirane rings is preferably used. With regard to the epoxy compound, only one kind thereof may be used or two or more kinds thereof may be used.

Specific examples of the epoxy compound include a bisphenol A epoxy compound, a glycidyl ester epoxy compound, an alicyclic epoxy compound, a polymer of a monomer having an oxirane ring, a copolymer of a monomer having an oxirane ring and another monomer.

Specific examples of the monomer having the oxirane ring include glycidyl (meth)acrylate, 3,4-epoxycyclohexyl (meth) acrylate, methylglycidyl (meth)acrylate and a compound represented by structure described below.

In addition, in the invention, (meth)acrylate means acrylate and/or methacrylate. (Meth)acryl means acryl and/or methacryl.

Specific examples of other monomers that copolymerize with the monomer having the oxirane ring include (meth) acrylic acid, methyl (meth)acrylate, ethyl (meth)acrylate, isopropyl (meth)acrylate, n-butyl (meth)acrylate, isobutyl (meth)acrylate, tert-butyl (meth)acrylate, cyclohexyl (meth) acrylate, benzyl (meth)acrylate, 2-hydroxyethyl (meth) acrylate, 2-hydroxypropyl (meth) acrylate, styrene, methyl styrene, chloromethyl styrene, (3-ethyl-3-oxetanyl) methyl (meth)acrylate, N-cyclohexylmaleimide and N-phenylmaleimide.

Preferred specific examples of the polymer of the monomer having the oxirane ring, and the copolymer of the monomer having the oxirane ring and another monomer include polyglycidyl methacrylate, a copolymer of methyl methacrylate and glycidyl methacrylate, a copolymer of benzyl methacrylate and glycidyl methacrylate, a copolymer of n-butyl methacrylate and glycidyl methacrylate, a copolymer of 2-hydeoxyethyl methacrylate and glycidyl methacrylate, a copolymer of (3-ethyl-3-oxetanyl)methyl methacrylate and glycidyl methacrylate and a copolymer of styrene and glycidyl methacrylate. If the composition of the invention contains the epoxy compounds, heat resistance of the cured film formed from the composition is further improved, and therefore such a case is preferred.

Specific examples of the epoxy compound include "807," "815," "825," "827," "828," "828EL," "871," "872," "190P," "191P," "1001," "1004," "1004AF," "1007," "1256," "157S70," "1032H60," (product names for all, made by Mitsubishi Chemical Corporation), "Araldite CY177," "Araldite CY184" (the are product names, made by BASF Japan Ltd.), "Celloxide 2021P," "Celloxide 3000," "Celloxide 8000," "EHPE-3150" (product names for all, made by Daicel Corporation), "TECHMORE VG3101L" (product name, made by Printec Corporation), "HP 7200," "HP 7200H," "HP 7200HH," (product names for all, made by DIC Corporation), "NC-3000," "NC-3000H," "EPPN-501H," "EOCN-1025," "EOCN-1035," "EOCN-1045," "EPPN-501H," "EPPN-501HY," "EPPN-502H," "EPPN- 201-L" (product names for all, made by Nippon Kayaku Co., Ltd.), "TEP-G" (product name, made by Asahi Yukizai Corporation), "MA-DGIC," "Me-DGIC," "TG-G" (product names for all, made by Shikoku Chemicals Corporation), "TEPIC-VL" (product name, made by Nissan Chemical Industries, Ltd.), "FLEP-10," "FLEP-50," "FLEP-60," "FLEP-80" (product names for all, Toray Thiokol Co., Ltd.), N,N,N',N'-tetraglycidyl-m-xylylenediamine, 1,3-bis(N,N-diglycidylaminomethyl)cyclohexane and N,N,N',N'-tetraglycidyl-4,4'-diaminodiphenylmethane. Among the materials, a composition containing a product under the product name "Araldite CY184," "Celloxide 2021P," "TECHMORE VG3101L," or "828" is preferred because the cured film having particularly satisfactory flatness can be obtained.

A concentration of the epoxy compound used as the additive in the composition of the invention is not particularly limited. In view of capability of obtaining the well-balanced and excellent cured film in heat resistance and adhesion to glass or ITO, the epoxy compound is contained in an amount of preferably 0 to 50% by weight, and further preferably 0 to 40% by weight, in the solid content (residue obtained by removing the solvent from the composition) in the composition of the invention.

1.6.2. Polyimide Resin

The polyimide resin is not particularly limited if an imide group is contained therein.

With regard to the polyimide resin, only one kind thereof may be used or two or more kinds thereof may be used.

The polyimide resin is obtained by imidizing amid acid obtained by allowing acid dianhydride to react with diamine, for example. Specific examples of the acid dianhydride include tetracarboxylic dianhydride (a1) that can be used in synthesis of polyester amide acid (A). Specific examples of the diamine include diamine (a2) that can be used in synthesis of polyester amide acid (A).

When the composition of the invention contains the polyimide resin, a concentration of the polyimide resin in the composition of the invention is not particularly limited. In view of capability of obtaining the cured film having further satisfactory heat resistance and chemical resistance, the concentration is preferably 0.1 to 20% by weight, and further preferably 0.1 to 10% by weight.

1.6.3. Polymerizable Monomer

Specific examples of the polymerizable monomer include a monofunctional polymerizable monomer, difunctional (meth)acrylate and trifunctional or higher-functional polyfunctional (meth)acrylate. With regard to the polymerizable monomer, only one kind thereof may be used or two or more kinds thereof may be used.

When the composition of the invention contains the polymerizable monomer, a concentration of the polymerizable monomer in the composition of the invention is not particularly limited. In view of capability of obtaining the cured film having further satisfactory chemical resistance or surface hardness, or the like, the polymerizable monomer is contained in an amount preferably 10 to 80% by weight, and further preferably 20 to 70% by weight in the solid content (residue obtained by removing the solvent from the composition) in the composition of the invention.

Specific examples of the monofunctional polymerizable monomer include 2-hydroxyethyl (meth) acrylate, 2-hydroxypropyl (meth) acrylate, 4-hydroxybutyl (meth) acrylate, 1,4-cyclohexanedimethanol mono(meth)acrylate, methyl (meth) acrylate, ethyl (meth)acrylate, isopropyl (meth)acrylate, butyl (meth)acrylate, isobutyl (meth)acrylate, t-butyl (meth)acrylate, cyclohexyl (meth)acrylate, phenyl (meth)acrylate, benzyl (meth) acrylate, isobornyl (meth) acrylate, dicyclopentenyloxyethyl (meth)acrylate, tricyclo[5.2.1.0$^{2,6}$]decanyl (meth)acrylate, glycerol mono(meth) acrylate, 5-tetrahydrofurfuryloxycarbonylpentyl (meth) acrylate, (meth)acrylate of an ethylene oxide adduct of lauryl alcohol, glycidyl (meth)acrylate, methyl glycidyl (meth)acrylate, 3,4-epoxycyclohexyl (meth) acrylate, 3-methyl-3-(meth)acryloxymethyl oxetane, 3-ethyl-3-(meth)acryloxymethyl oxetane, 3-methyl-3-(meth)acryloxyethyl oxetane, 3-ethyl-3-(meth)acryloxyethyl oxetane, p-vinylphenyl-3-ethyloxeta-3-ylmethyl ether, 2-phenyl-3-(meth)acryloxymethyl oxetane, 2-trifluoromethyl-3-(meth)acryloxymethyl oxetane, 4-trifluoromethyl-2-(meth)acryloxymethyl oxetane, (3-ethyl-3-oxetanyl)methyl (meth)acrylate, styrene, methyl styrene, chloromethyl styrene, vinyltoluene, N-cyclohexylmaleimide, N-phenylmaleimide, (meth)acrylic amide, N-acryloylmorpholine, a polystyrene macromonomer, a polymethyl methacrylate macromonomer, (meth)acrylic acid, crotonic acid, α-chloroacrylic acid, cinnamic acid, maleic acid, fumaric acid, itaconic acid, citraconic acid, mesaconic acid, ω-carboxypolycaprolactone mono(meth)acrylate, mono[2-(meth)acryloyloxyethyl] succinate, maleic acid mono[2-(meth)acryloyloxyethyl] and cyclohexane-3,4-dicarboxylic acid mono[2-(meth)acryloyloxyethyl].

Specific examples of the difunctional (meth)acrylate include bisphenol F ethylene oxide-modified di(meth)acrylate, bisphenol A ethylene oxide-modified di(meth)acrylate, isocyanuric ethylene oxide-modified di(meth)acrylate, polyethylene glycol di(meth)acrylate, polypropylene glycol di(meth)acrylate, pentaerythritol di(meth)acrylate, pentaerythritol di(meth)acrylate monostearate, 1,4-butandiol di(meth)acrylate, 1,6-hexanediol di(meth)acrylate, 1,9-nonanediol di(meth)acrylate, 1,4-cyclohexanedimethanol di(meth)acrylate, 2-n-butyl-2-ethyl-1,3-propanediol di(meth)acrylate, trimethylolpropane di(meth)acrylate and dipentaerythritol di(meth)acrylate.

Specific examples of the trifunctional or higher-functional polyfunctional (meth)acrylate include trimethylolpropane tri(meth)acrylate, ethylene oxide-modified trimethylolpropane tri(meth)acrylate, propylene oxide-modified trimethylolpropane tri(meth)acrylate, epichlorohydrin-modified trimethylolpropane tri(meth)acrylate, ditrimethylolpropane tetra (meth)acrylate, glycerol tri(meth)acrylate, epichlorohydrin-modified glycerol tri(meth)acrylate, diglycerin tetra(meth) acrylate, pentaerythritol tri(meth)acrylate, pentaerythritol tetra(meth)acrylate, dipentaerythritol penta(meth)acrylate, alkyl-modified dipentaerythritol penta(meth)acrylate, alkyl-modified dipentaerythritol tetra(meth)acrylate, alkyl-modified dipentaerythritol tri(meth)acrylate, dipentaerythritol hexa(meth)acrylate, caprolactone-modified dipentaerythritol hexa(meth)acrylate, ethylene oxide-modified phosphoric acid tri(meth)acrylate, tris[(meth)acryloxyethyl] isocyanurate, caprolactone-modified tris[(meth)acryloxyethyl] isocyanurate and urethane (meth) acrylate.

1.6.4 Antistatic Agent

An antistatic agent can be used for preventing the composition of the invention from being charged. When the composition of the invention contains the antistatic agent, the antistatic agent is used in an amount of preferably 0.01 to 1% by weight in the composition of the invention.

As the antistatic agent, a publicly-known antistatic agent can be used. Specific examples thereof include metal oxide such as tin oxide, complex oxide of tin oxide and antimony oxide, and complex oxide of tin oxide and indium oxide and a quaternary ammonium salt.

With regard to the antistatic agent, only one kind thereof may be used or two or more kinds thereof may be used.

1.6.5. Coupling Agent

The coupling agent is not particularly limited. For the purpose of improving adhesion to glass or ITO, or the like, a publicly-known coupling agent such as a silane coupling agent can be used. When the composition of the invention contains the coupling agent, the coupling agent is preferably used by being added to be in an amount of 10% by weight or less based on 100% by weight of the solid content (residue obtained by removing the solvent from the composition) in the composition of the invention.

With regard to the coupling agent, only one kind thereof may be used or two or more kinds thereof may be used.

Specific examples of the silane coupling agent include a trialkoxysilane compound and a dialkoxysilane compound. Preferred specific examples thereof include γ-vinylpropyl trimethoxysilane, γ-vinylpropyl triethoxysilane, γ-acryloylpropylmethyl dimethoxysilane, γ-acryloylpropyl trimethoxysilane, γ-acryloylpropylmethyl diethoxysilane, γ-acryloylpropyl triethoxysilane, γ-methacryloylpropylmethyl dimethoxysilane, γ-methacryloylpropyl trimethoxysilane, γ-methacryloylpropyl methyldiethoxysilane, γ-methacryloylpropyltriethoxysilane, γ-glycidoxypropylmethyl dimethoxysilane, γ-glycidoxypropyl trimethoxysilane, γ-glycidoxypropylmethyl diethoxysilane, γ-glycidoxypropyl triethoxysilane, γ-aminopropylmethyl dimethoxysilane, γ-aminopropyl methoxysilane, γ-aminopropylmethyl diethoxysilane, γ-aminopropyltriethoxysilane, N-aminoethyl-γ-iminopropylmethyl dimethoxysilane, N-aminoethyl-γ-aminopropyl trimethoxysilane, N-aminoethyl-γ-aminopropyltodietoxysilane, N-phenyl-γ-aminopropyl trimethoxysilane, N-phenyl-γ-aminopropyl trietoxysilane, N-phenyl-γ-aminopropylmethyl dimethoxysilane, N-phenyl-γ-aminopropylmethyl diethoxysilane, γ-mercaptopropylmethyl dimethoxysilane, γ-mercaptopropylmethyl diethoxysilane, γ-mercaptopropyl triethoxysilane, γ-isocyanatepropylmethyl diethoxysilane and γ-isocyanatepropyl triethoxysilane.

Among the materials, γ-vinylpropyl trimethoxysilane, γ-acryloylpropyl triethoxysilane, γ-methacryloylpropyl trimethoxysilane, γ-glycidoxypropyl trimethoxysilane, or γ-isocyanatepropyl triethoxysilane is particularly preferred.

1.6.6 Antioxidant

The composition of the invention contains an antioxidant. Thus, deterioration when the cured film obtained from the composition is exposed to high temperature or light. When the composition of the invention contains the antioxidant, the antioxidant is used by being added in an amount preferably 0.1 to 3 parts by weight based on 100 parts by weight of the solid content (residue obtained by removing the solvent from the composition) in the composition excluding the antioxidant.

With regard to the antioxidant, only one kind thereof may be used or two or more kinds thereof may be used.

Examples of the antioxidant include a hindered amine-based compound and a hindered phenol-based compound. Specific examples thereof include IRGAFOS XP40, IRGAFOS XP60, IRGANOX 1010, IRGANOX 1035, IRGANOX 1076, IRGANOX 1135 and IRGANOX 1520L (product names for all, made by BASF Japan Ltd.).

1.6.7 Surfactant

The composition of the invention contains a surfactant. Thus, the composition having improved wettability, leveling properties, and applicability to a base substrate can be obtained. When the composition of the invention contains the surfactant, the surfactant is used to be in an amount of preferably 0.01 to 1% by weight based on 100% by weight of the composition of the invention.

With regard to the surfactant, only one kind thereof may be used or two or more kinds thereof may be used.

In view of capability of improving applicability of the composition of the invention, or the like, specific example thereof include a silicon-based surfactant such as "BYK-300," "BYK-306," "BYK-335," "BYK-310," "BYK-341," "BYK-344," and "BYK-370" under product names (for all, made by BYK Japan KK), "KP-112," "KP-326," and "KP-341" under product names (for all, made by Shin-Etsu Chemical Co., Ltd.); an acrylic surfactant such as "BYK-354," "BYK-358," and "BYK-361" under product names (made by BYK Japan KK); and a fluorine-based surfactant such as "DFX-18," "Ftergent 250," and "Ftergent 251" under product names (made by NEOS Company Limited).

1.6.8. Epoxy Curing Accelerator

In view of capability of reducing a curing temperature of the composition of the invention, or shortening a curing period of time, specific examples of the epoxy curing accelerator include "DBU," "DBN," "U-CAT," "U-CAT SA1," "U-CAT SA102," "U-CAT SA506," "U-CAT SA603," "U-CAT SA810," "U-CAT 5002," "U-CAT 5003," "U-CAT 18X," "U-CAT SA841, 851," "U-CAT SA881," and "U-CAT 891" (product names for all, made by San-Apro Ltd.) and "CP-001," and "NV-203-R4" (product names for all, made by Osaka Gas Chemicals Co., Ltd.).

With regard to each epoxy curing accelerator, only one kind thereof may be used or two or more kinds thereof may be used.

A content of the epoxy curing accelerator is preferably 10 to 200% by weight, further preferably 20 to 180% by weight, and still further preferably 30 to 150% by weight, based on 100% by weight of epoxy curing agent (c).

2. Method of Preparing Thermosetting Resin Composition

The composition of the invention can be prepared by mixing polyester amide acid (A), epoxy compound (B) having the fluorene skeleton, epoxy curing agent (C) and colorant (D), and when necessary, solvent (E), other additives, or the like.

The composition of the invention can also be prepared by directly mixing a reaction liquid or a mixture liquid obtained during synthesis of polyester amide acid (A) to epoxy compound (B) having the fluorene skeleton, and epoxy curing agent (C) and solvent (E), other additives, or the like to be used when necessary.

3. Method of Forming Cured Film

The cured film of the invention is not particularly limited if a film obtained from the composition of the invention is applied. The cured film of the invention can be obtained by applying, onto the substrate, the composition of the invention and heating the resulting material, for example.

In the following, a method of applying and curing the composition of the invention will be described.

3.1. Method of Applying Thermosetting Resin Composition

The composition of the invention can be applied onto the substrate by a method that has been publicly known so far, such as a spray coating method, a spin coating method, a roll coating method, a dipping method, a slit coating method, a bar coating method, a gravure printing method, a flexographic printing method, an offset printing method, a dispenser method, a screen printing method and an inkjet printing method.

When the light shielding member is formed thereon by using the composition of the invention, for example, in view of predominantly small amount of use ink in comparison with a conventional application method, and no need of using a photomask, or the like, an inkjet method is preferred. According to the inkjet method, a variety of cured films can be produced in a large volume, and the number of steps required for producing the cured films is small.

When the light shielding member is formed from the composition of the invention by applying the inkjet method, a method having a step of forming a coated film by applying the composition on a substrate by the inkjet method (coated film-forming step), and a step of forming the cured film by applying heat treatment to the coated film (heating step) can be applied. In the method, a step of applying surface treatment to the substrate (surface treatment step) is preferably provided before the composition of the invention in applied onto the substrate, and the coated film is formed by applying, onto the substrate subjected to the surface treatment, the composition of the invention.

When the coated film is formed in a pattern form, the cured film is also formed in the pattern form. In the present description, unless otherwise noted, "cured film" includes the cured film in the pattern form.

The thus produced cured film may be used by being peeled from the substrate, or may be used directly without being peeled from the substrate, in response to a desired application or substrate to be used.

The cured film having excellent adhesion with the substrate can be obtained by including the surface treatment step. Specific examples of the surface treatment include silane coupling agent treatment, UV ozone ashing treatment, plasma treatment, alkali etching treatment, acid etching treatment and primer treatment.

Moreover, when an insulating film provided in such a manner that an electrode is not brought into contact therewith from the composition of the invention, for example, in view of ease of forming the pattern, a printing method such as a gravure printing method, a flexographic printing method, an offset printing method, a dispenser method, a screen printing method and an inkjet printing method is preferred.

Moreover, when the overcoat is formed from the composition of the invention, for example, in view of ease of whole surface printing, an application method such as a spin coating method, a slit coating method, a gravure printing method, a flexographic printing method, an offset printing method, a dispenser method and a screen printing method is preferred.

The substrate is not particularly limited and a publicly-known substrate can be used. Specific examples thereof include: a glass epoxy substrate, a glass composite substrate, a paper phenol substrate, a paper epoxy substrate, a green epoxy substrate, a bismaleimide-triazine (BT) resin substrate in conformity with various standards such as FR-1, FR-3, FR-4, or CEM-3; a substrate formed of a metal such as copper, brass, phosphor bronze, beryllium copper, aluminum, gold, silver, nickel, tin, chrome and stainless steel (may be a substrate having, on a surface thereof, a layer formed of the metal; a substrate formed of an inorganic substance such as indium tin oxide (ITO), aluminum oxide (alumina), aluminum nitride, zirconium oxide (zirconia), silicate of zirconium (zircon), magnesium oxide (magnesia), aluminum titanate, titanic acid barium, lead titanate (PT), lead zirconate titanate (PZT), plomb lanthanum zirconate titanate (PLZT), lithium niobate, lithium tantalate, cadmium sulfide, molybdenum sulfide, beryllium oxide (beryllia), silicon oxide (silica), silicon carbide, silicon nitride, boron nitride, zinc oxide, mullite, ferrite, steatite, forsterite, spinel and spodumene (may be a substrate having, on a surface thereof, a layer containing the inorganic substance); a substrate formed of a resin such as polyethylene terephthalate (PET), polyethylene naphthalate (PEN), polybutylene terephthalate (PBT), polycyclohexylenedimethylene terephthalate (PCT), polyphenylene sulfide (PPS), polycarbonate, polyacetal, polyphenylene ether, polyimide, polyamide, polyarylate, polysulfone, polyethersulfone, polyetherimide, polyamide-imide, an epoxy resin, an acrylic resin, Teflon (registered trademark), a thermoplastic elastomer and a liquid crystal polymer (may be a substrate having, on a surface thereof, a layer containing the resin); a semiconductor substrate such as silicon, germanium and gallium arsenide; a glass substrate; a substrate having an electrode material (wiring) such as tin oxide, zinc oxide, ITO or antimony tin oxide (ATO) formed on a surface thereon; and a gel sheet such as αGEL, βGEL, θGEL and γGEL (for all, the registered trademarks of Taica Corporation).

The composition of the invention is preferably applied onto the glass substrate, the ITO substrate, or the film substrate made of the resin.

3.2. Method of Curing Thermosetting Resin Composition

The cured film can be obtained by applying the composition of the invention onto the substrate, and then heating the composition applied on the substrate. As a method of thus forming the cured film, such a method is preferably applied, in which the composition of the invention is applied thereon, and then a solvent is removed by evaporation or the like (drying treatment) by heating the resulting material on a hot plate or in an oven, and then the resulting material is further heated (curing treatment).

Conditions of the drying treatment are different depending on a kind and a blending proportion of each component contained in the composition used. A heating temperature is ordinarily 70 to 120° C., and a heating time is 5 to 15 minutes in the oven or 1 to 10 minutes on the hot plate. The coated film at a degree at which a shape thereof can be kept on the substrate can be formed by such drying treatment.

After the coated film is formed, the curing treatment is applied ordinarily at 80 to 300° C., and preferably at 100 to 250° C. On the above occasion, the cured film can be obtained by applying the heating treatment ordinarily for 10 to 120 minutes when the oven is used, and ordinarily for 5 to 30 minutes when the hot plate is used.

In addition, the curing treatment is not limited to the heating treatment and may be treatment by irradiation with ultraviolet light, ion beams, electron beams or gamma rays.

4. Substrate with Cured Film

The substrate with the cured film of the invention is not particularly limited if the substrate has the cured film of the invention. However, the substrate, particularly at least one kind of substrate selected from the group of a glass substrate, an ITO substrate and a resin film substrate preferably has the cured film thereon.

Such a substrate with the cured film can be formed by applying, on a substrate such as glass, ITO, PET and PEN, the composition of the invention by the application method or the like wholly or in a predetermined pattern form (line or the like), and then passing the applied material through the drying treatment and the curing treatment as described above.

5. Electronic Component

The electronic component of the invention is an electronic component having the cured film or the substrate with the cured film as described above. Specific examples of such an electronic component include various optical materials such as a color filter, a light emitting device (LED) and a light receiving device, and a touch panel.

EXAMPLES

Hereinafter, the invention will be described by way of Examples and Comparative Examples. However, the invention is not limited to the Examples. A name and an abbreviation of tetracarboxylic dianhydride (a1), diamine (a2), polyvalent hydroxy compound (a3), monohydric alcohol (a4), reaction solvent (a5), acid anhydride (a6), epoxy compound (B) having a fluorene skeleton, a non-fluorene epoxy resin, epoxy curing agent (C), black pigment as colorant (D), solvent (E), and a surfactant each used in Examples and Comparative Examples will be described. The abbreviation will be used in the description below.
Tetracarboxylic Dianhydride (a1)
    ODPA: 3,3',4,4'-diphenylether tetracarboxylic dianhydride
Diamine (a2)
    DDS: 3,3'-diaminodiphenyl sulfone
Polyvalent hydroxy compound (a3)
    BDOH: 1,4-butanediol
Monohydric Alcohol (a4)
    BzOH: benzyl alcohol
Reaction Solvent (a5)
    PEGMEA: propylene glycol monomethylether acetate
    EDM: diethylene glycol methyl ethyl ether
Acid Anhydride (a6)
    SM: SMA1000 (product name, made by Kawahara Petrochemical Co., Ltd.)
Epoxy Compound (B) Having a Fluorene Skeleton
    EG-200: OGSOL EG-200 (product name, Osaka Gas Chemicals Co., Ltd.)
Epoxy Curing Agent (C)
    TMA: trimellitic acid, anhydrous
Colorant (D) (Black Pigment)
    Mulco 2004: Mulco 2004 black (product name, made by Tokushiki Co., Ltd., DPMA dispersion in which a solid content is 38.4% by weight of colorant (D), and a pigment solid content is 30.7% by weight of colorant (D))
    470M: MHI black # B470M (product name, made by Mikuni Color Ltd., EDM dispersion in which a solid content is 27% by weight of colorant (D), and a pigment solid content is 20% by weight of colorant (D))
Solvent (E)
    DPMA: dipropylene glycol methyl ether acetate
Non-fluorene Epoxy Compound (Epoxy Compound having No Fluorene Skeleton)
    VG: TECHMORE VG3101L (product name, made by Printec Corporation)
    JER: JER157S70 (product name, made by Mitsubishi Chemical Corporation)
    S510: 3-glycidoxypropyl trimethoxysilane (made by JNC Corporation)
Surfactant
    BYK342: BYK-342 (product name, made by BYK Japan KK)
    BYK361N: BYK-361N (product name, made by BYK Japan KK)

First, a polyester amide acid solution was synthesized as described below (synthesis Examples). In Table 1, components, physical properties, and so forth in Synthesis Examples are summarized.

Synthesis Example 1

Into a 1000 mL separable flask equipped with a thermometer, a stirring blade, a raw material charge port and a nitrogen gas inlet, 89.6 g of PEGMEA, as a reaction solvent, 8.48 g of ODPA, 25.8 g of SM, 9.85 g of BzOH, 1.64 g of BDOH and 17.12 g of EDM were charged, and the resulting mixture was stirred at 125° C. for 2 hours under a dry nitrogen flow. Then, the reaction liquid was cooled to 25° C., 2.26 g of DDS and 5.28 g of EDM were put therein, and the resulting mixture was stirred at 20 to 30° C. for 2 hours, and then stirred at 115° C. for 1 hour. Then, the resulting mixture was cooled to 30° C. or lower to obtain a 30 wt % solution of pale yellow, transparent polyester amide acid. In addition, a solid content concentration herein means a concentration of a component in the resulting mixture liquid excluding the reaction solvent. A similar description in Synthesis Examples described below has a meaning similar thereto.

Rotational viscosity of the solution was 38 mPa s. The rotational viscosity herein means viscosity measured at 25° C. by using a cone-plate viscometer (E type) (product name; VISCONIC END, made by Tokyo Keiki Inc.) (the same shall apply hereinafter.).

A weight average molecular weight of polyester amide acid obtained was 4,200. In addition, the weight average molecular weight of polyester amide acid was measured as described below.

The resulting polyester amide acid was diluted with N,N-dimethylformamide (DMF) to be about 1 wt % in a concentration of polyester amide acid. The weight average molecular weight was measured, by applying the diluted solution as a developer, according to a GPC method by using a GPC apparatus Chrom Nav (differential refractometer RI-2031 Plus) made by JASCO Corporation, and was determined in terms of a polystyrene equivalent. As a column, three columns of GF-1G7B, GF-510HQ and GF-310HQ made by Showa Denko K.K. were connected in the above order and used. Measurement was performed under condition of a column temperature of 40° C. and a flow rate of 0.5 mL/min.

TABLE 1

|  |  | Synthesis Example |
|---|---|---|
| Tetracarbolic dianhydride (a1) | OOPA (g) | 8.48 |
| Diamine (a2) | DDS (g) | 2.26 |
| Polyvalent hydroxy compound (a3) | BDOH (g) | 1.64 |
| Monohydric alcohol (a4) | BzOH (g) | 9.85 |
| Reaction solvent (a5) | PEGMEA (g) | 89.6 |
|  | EDM (g) | 22.4 |
| Polyvalent acid anhydride (a6) | SM (g) | 25.8 |
| Viscosity (25° C.) (mPa s) |  | 38 |
| Solid content concentration (% by weight) |  | 30 |
| Weight average molecular weight |  | 4,200 |

Example 1

An atmosphere in a 500 mL three-necked flask equipped with a stirring blade was replaced by nitrogen, and into the flask, 11.55 g of polyester amide acid solution obtained in Synthesis Example 1, 13.40 g of EG-200, 0.58 g of S510, 0.69 g of TMA, 79.00 g of Mulco 2004 black, and 71.30 g of dewatered and purified DPMA were charged, and the resulting mixture was stirred at room temperature for 1 hour to uniformly dissolve components thereinto. Next, 0.18 g of BYK342 and 0.18 g of BYK361N were put therein, the resulting mixture was stirred at room temperature for 1 hour, and filtered by a membrane filter (0.5 μm) to obtain a filtrate (thermosetting resin composition).

Rotational viscosity of the composition was 8.6 mPa s.

Examples 2 and 3 and Comparative Example

In Examples 2 and 3 and Comparative Example, a thermosetting composition was prepared in a manner similar to Example 1 except that a kind and an amount of charging each component were changed as shown in Table 1.

TABLE 2

| | | Example 1 | Example 2 | Example 3 | Comparative Example 1 |
|---|---|---|---|---|---|
| Polyester amide acid (A) | Synthesis Example 1 | 11.55 | 11.55 | 11.55 | 11.55 |
| Epoxy compound having fluorene skeleton (B) | EG-200 | 13.40 | 6.95 | 6.95 | — |
| Epoxy curing agent (C) | TMA | 0.69 | 0.69 | 0.69 | 0.69 |
| Colorant (D) (black pigment) | Mulco 2004 | 79 | 71 | — | 60 |
| | 470M | — | — | 126 | — |
| Solvent (E) | DPMA | 71.3 | 63.5 | 33 | 52.5 |
| Non-fluorene epoxy compound | JER S510 | — | 4.63 | 4.63 | — |
| | VG | 0.58 | 0.58 | 0.58 | 0.58 |
| | | — | — | — | 9.07 |
| Surfactant | BYK-342 | 0.18 | 0.16 | 0.18 | 0.13 |
| | BYK-361N | 0.18 | 0.16 | 0.18 | 0.13 |
| Proportion of pigment solid content to resin solid content | % | 100 | 100 | 100 | 100 |
| Viscosity | mPa s | 8.6 | 8.5 | 7.6 | 8.7 |

"Proportion of pigment solid content to resin solid content" shown in Table 2 refers to a proportion (% by weight) of the pigment solid content relative to 100% by weight of the resin solid content in the thermosetting resin composition. A weight of the resin solid content in the thermosetting resin composition herein means a weight obtained by adding a resin solid content other than colorant (D) and a solid content other than the pigment solid content in the solid content in colorant (D). A weight of the pigment solid content in the thermosetting resin composition means a weight of the pigment solid content in the solid content in colorant (D).

The thermosetting resin composition obtained as described above was spin-coated on glass described below to have a thickness shown in Table 2 in a thickness of the cured film to be obtained. Then, the resulting material was dried on a hot plate at 80° C. for 3 minutes to form a coated film.

Glass: 4 cm-square glass substrate (product name: EAGLE XG, made by Corning Incorporated)

Then, the coated film was heated at 230° C. for 30 minutes in an oven and cured. For the thus obtained cured film, an OD value, adhesion and hardness were evaluated.

Evaluation Method (i) Light Shielding Properties (Evaluation by OD Value)

A Y value was measured on the resulting glass substrate with the cured film by using Ultraviolet-Visible Spectrophotometer V-670 made by JASCO Corporation. An OD value was calculated from the Y value by a formula shown below.

OD=−log(Y/100)

The OD value per unit pm, namely per 1 μm of a film thickness of the cured film was calculated by dividing the value by the thickness of the cured film.

(ii) Adhesion

Adhesion between a glass substrate and a cured film was evaluated, on the glass substrate (substrate 1) with the cured film obtained by heating and calcinating the substrate in an oven, by conducting a cross-cut test (JIS-K-5400) by tape peeling of the cured film, and counting the number of remaining cross-cuts. The evaluation results were shown in terms of the number of remaining cross-cuts/100. In a similar manner, an evaluation was also performed on the glass substrate (substrate 2) with the cured film further subjected to additional calcination treatment to the substrate 1 at 280° C. for 30 minutes, and on the glass substrate (substrate 3) with the cured film after immersing the substrate 1 into a 5 wt % sodium hydroxide solution (40° C.) for 5 minutes and washing with ultrapure water and drying the resulting material.

(iii) Hardness

An evaluation was performed on the resulting glass substrates with the cured films by measuring hardness on cured film surfaces by a pencil hardness tester in accordance with JIS-K-5400.

TABLE 3

| | | Example 1 | Example 2 | Example 3 | Comparative Example 1 |
|---|---|---|---|---|---|
| OD value | —/μm | 2.2 | 2.2 | 2.6 | 2.1 |
| Adhesion | After calcination at 230° C. for 30 minutes (substrate 1) | 100/100 | 100/100 | 100/100 | 100/100 |
| | After additional calcination at 280° C. for 30 minutes (substrate 2) | 100/100 | 100/100 | 100/100 | 0/100 |
| | 5% NaOH (substrate 3) | 78/100 | 100/100 | 100/100 | 72/100 |
| Surface hardness | Pencil hardness | 3H | 3H | B | 3H |
| Film thickness | μm | 1.0 | 0.9 | 1.1 | 1.0 |

As is obvious from the results shown in Table 3, the cured films formed from the thermosetting resin compositions obtained in Examples 1 to 3 were excellent in heat resistance (adhesion after additional calcination at 280° C. for 30 minutes). In particular, the cured film in Example 2 was also excellent in chemical resistance (adhesion after immersion in 5% NaOH), and also in hardness.

Comparison of Example 1 with Comparative Example 1 shows that the cured films that maintain high adhesion after applying treatment at high temperature and treatment with the sodium hydroxide solution were obtained by using the compositions each containing the epoxy compound (EG-200) having the fluorene skeleton as epoxy.

Comparison of Example 1 with Example 2 and Example 3 shows that the cured films that maintain high adhesion after applying treatment at high temperature and treatment with the sodium hydroxide solution were obtained by using the compositions each further containing non-fluorene-type JER.

Comparison of Example 2 with Example 3 shows that the cured films each having high hardness can be obtained by using titanium black as colorant (D).

As described above, only the cured film obtained from the composition containing the polyester amide acid, the epoxy resin having the fluorene skeleton, the epoxy curing agent and black pigment was able to satisfy all of desired characteristics.

INDUSTRIAL APPLICABILITY

A composition of the invention has proper viscosity at which an ink can be output by an inkjet apparatus, while a cured film satisfies light shielding properties required as a light shielding member. Thus, for example, the composition can be used in the light shielding member that shields a black matrix in a liquid crystal display device or an electrode part around a screen portion of a smartphone in appearance.

What is claimed is:

1. A thermosetting resin composition, comprising:
   a polyester amide acid (A);
   an epoxy compound (B) having a fluorene skeleton;
   an epoxy curing agent (C); and
   a colorant (D),
   wherein the thermosetting resin composition is inkjet-printing ink,
   an amount of the polyester amide acid (A) in the composition is in a range from 1 to 60% by weight relative to a resin solid content as 100% by weight,
   an amount of the epoxy compound (B) having the fluorene skeleton in the composition is in a range from 1 to 90% by weight relative to the resin solid content as 100% by weight,
   an amount of the epoxy curing agent (C) in the composition is in a range from 0.1 to 50% by weight relative to the resin solid content as 100% by weight,
   an epoxy equivalent in the epoxy compound (B) having the fluorene skeleton is in a range from 200 to 550 g/eq,
   the amount of the epoxy compound (B) having the fluorene skeleton in the composition is in a range from 10 to 400 parts by weight relative to the polyester amide acid (A) as 100 parts by weight,
   the colorant (D) comprises an inorganic pigment, and
   an amount of the inorganic pigment in the colorant (D) in the composition is in a range from 80 to 140 parts by weight relative to the resin solid content as 100 parts by weight.

2. The thermosetting resin composition according to claim 1, wherein the amount of the epoxy curing agent (C) is in a range from 1 to 380 parts by weight relative to the epoxy compound (B) having the fluorene skeleton as 100 parts by weight.

3. The thermosetting resin composition according to claim 1, wherein the epoxy curing agent (C) is an anhydride curing agent.

4. The thermosetting resin composition according to claim 1, wherein a weight average molecular weight of the polyester amide acid (A) is in a range from 2,000 to 30,000.

5. The thermosetting resin composition according to claim 1, wherein the polyester amide acid (A) is a compound having a structural unit shown by formulas (1) and (2):

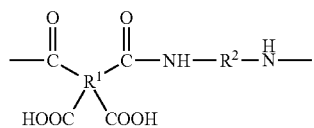

(1)

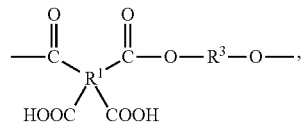

(2)

wherein, $R^1$ is independently a tetravalent organic group having 1 to 30 carbons, $R^2$ is a divalent organic group having 1 to 40 carbons, and $R^3$ is a divalent organic group having 1 to 20 carbons.

6. The thermosetting resin composition according to claim 1, wherein the polyester amide acid (A) is a compound obtained by allowing a tetracarboxylic dianhydride (a1), a diamine (a2) and a polyvalent hydroxy compound (a3) to react with one another as essential components.

7. The thermosetting resin composition according to claim 6, wherein the tetracarboxylic dianhydride (a1) is at least one compound selected from the group consisting of 3,3',4,4'-diphenylsulfonetetracarboxylic dianhydride, 3,3'4,4'-diphenylethertetracarboxylic dianhydride, 2,2-(bis(3,4-dicarboxyphenyl))hexafluoropropane dianhydride and ethylene glycol bis(anhydrotrimellitate).

8. The thermosetting resin composition according to claim 6, wherein the diamine (a2) is at least one compound selected from the group consisting of 3,3'-diaminodiphenyl sulfone and bis[4-(3-aminophenoxy)phenyl] sulfone.

9. The thermosetting resin composition according to claim 6, wherein the polyvalent hydroxy compound (a3) is at least one compound selected from the group consisting of ethylene glycol, propylene glycol, 1,4-butanediol, 1,5-pentanediol, 1,6-hexanediol, 1,7-heptanediol and 1,8-octanediol.

10. The thermosetting resin composition according to claim 6, wherein the tetracarboxylic dianhydride (a1) is 3,3',4,4'-diphenylethertetracarboxylic dianhydride, the diamine (a2) is 3,3'-diaminodiphenyl sulfone, the polyvalent hydroxy compound (a3) is 1,4-butanediol, and the epoxy curing agent (C) is trimellitic anhydride.

11. The thermosetting resin composition according to claim 1, wherein the polyester amide acid (A) is a compound obtained by allowing a tetracarboxylic dianhydride (a1), a diamine (a2), a polyvalent hydroxy compound (a3) and a monohydric alcohol (a4) to react with one another as essential components.

12. The thermosetting resin composition according to claim 11, wherein the monohydric alcohol (a4) is at least one compound selected from the group consisting of isopropyl alcohol, allyl alcohol, benzyl alcohol, hydroxyethyl methacrylate, propylene glycol monoethyl ether and 3-ethyl-3-hydroxymethyl oxetane.

13. The thermosetting resin composition according to claim 1, wherein the polyester amide acid (A) is a compound obtained by allowing X mol of a tetracarboxylic dianhydride (a1), Y mol of a diamine (a2), and Z mol of a polyvalent hydroxy compound (a3) to react with one another in ratios at which relationships represented by expressions (3) and (4) hold:

$$0.2 \leq Z/Y \leq 8.0 \tag{3}$$

$$0.2 \leq (Y+Z)/X \leq 1.5 \tag{4}$$

14. The thermosetting resin composition according to claim 1, further comprising a solvent (E).

15. The thermosetting resin composition according to claim 1, wherein the colorant (D) is titanium compound particles.

16. A cured film, obtained from the thermosetting resin composition according to claim 1.

17. A substrate with a cured film, comprising the cured film according to claim 16.

18. An electronic component, comprising the cured film according to claim 16 or a substrate with a cured film comprising the cured film according to claim 16.

19. The thermosetting resin composition according to claim 1, wherein the epoxy equivalent in the epoxy compound (B) having the fluorene skeleton is in a range from 240 to 550 g/eq.

* * * * *